(12) United States Patent
Yamamoto et al.

(10) Patent No.: US 12,011,703 B2
(45) Date of Patent: Jun. 18, 2024

(54) REACTOR

(71) Applicant: IHI CORPORATION, Tokyo (JP)

(72) Inventors: Taiga Yamamoto, Tokyo (JP); Yusuke Takeuchi, Tokyo (JP); Akihisa Yano, Tokyo (JP); Shigeki Sakakura, Tokyo (JP); Shunji Miyajima, Tokyo (JP)

(73) Assignee: IHI CORPORATION, Tokyo (JP)

( * ) Notice: Subject to any disclaimer, the term of this patent is extended or adjusted under 35 U.S.C. 154(b) by 684 days.

(21) Appl. No.: 17/321,784

(22) Filed: May 17, 2021

(65) Prior Publication Data

US 2021/0268472 A1  Sep. 2, 2021

Related U.S. Application Data

(63) Continuation of application No. PCT/JP2019/046042, filed on Nov. 26, 2019.

(30) Foreign Application Priority Data

Nov. 26, 2018 (JP) .................................. 2018-220447

(51) Int. Cl.
*B01J 19/24* (2006.01)
*F28D 9/00* (2006.01)
*F28D 21/00* (2006.01)

(52) U.S. Cl.
CPC .......... *B01J 19/249* (2013.01); *F28D 9/0037* (2013.01); *B01J 2219/2453* (2013.01); *B01J 2219/2459* (2013.01); *B01J 2219/2461* (2013.01); *F28D 2021/0022* (2013.01)

(58) Field of Classification Search
CPC .............. B01J 19/249; B01J 2219/2453; B01J 2219/2459; B01J 2219/2461; B01J 2219/2458; B01J 2219/2462; B01J 2219/2479; B01J 2219/2485; F28D 9/0037; F28D 2021/0022
USPC ........................................................ 422/198
See application file for complete search history.

(56) References Cited

U.S. PATENT DOCUMENTS

| 6,159,358 A | 12/2000 | Mulvaney, III et al. |
| 6,447,736 B1 | 9/2002 | Autenrieth et al. |
| 2003/0105172 A1 | 6/2003 | Bowe et al. |
| 2008/0131341 A1 | 6/2008 | Bowe et al. |

(Continued)

FOREIGN PATENT DOCUMENTS

| EP | 3 305 402 A1 | 4/2018 |
| JP | 2003-519563 A | 6/2003 |

(Continued)

OTHER PUBLICATIONS

European Patent Office, "Extended European Search Report," issued in European Patent Application No. 19 891 221.4, which is a counterpart to U.S. Appl. No. 17/321,784, on Jun. 13, 2022, 8 pages.

*Primary Examiner* — Huy Tram Nguyen

(57) ABSTRACT

A reactor includes first heat transfer bodies including reaction flow channels through which a reaction fluid flows, second heat transfer bodies stacked on the first heat transfer bodies and including heat medium flow channels through which a heat medium flows and product flow channels through which a product flows that is produced in the reaction flow channels by a heat exchange between the reaction fluid and the heat medium, and product communication parts including communication spaces through which the product flows from the reaction flow channels to the product flow channels.

9 Claims, 3 Drawing Sheets

(56) References Cited

U.S. PATENT DOCUMENTS

| | | |
|---|---|---|
| 2008/0227874 A1 | 9/2008 | Bowe et al. |
| 2012/0031599 A1 | 2/2012 | Obuchi et al. |
| 2018/0093242 A1 | 4/2018 | Yano et al. |
| 2018/0326387 A1 | 11/2018 | Kamata et al. |
| 2020/0018553 A1 | 1/2020 | Yano et al. |
| 2020/0206708 A1 | 7/2020 | Yano et al. |

FOREIGN PATENT DOCUMENTS

| | | |
|---|---|---|
| JP | 2009-203136 A | 9/2009 |
| JP | 2017-148704 A | 8/2017 |
| WO | 2010/074154 A1 | 7/2010 |
| WO | 2016/199791 A1 | 12/2016 |
| WO | 2018/181651 A1 | 10/2018 |

REACTOR

CROSS REFERENCE TO RELATED APPLICATIONS

This application is a continuation application of International Application No. PCT/JP2019/046042, filed on Nov. 26, 2019, which claims priority to Japanese Patent Application No. 2018-220447, filed on Nov. 26, 2018, the entire contents of which are incorporated by reference herein.

BACKGROUND

1. Technical Field

The present disclosure relates to a heat exchanger-type reactor.

2. Description of the Related Art

Reactors are known that cause a heat exchange between a first fluid and a second fluid, either or both being a reaction fluid, to promote a reaction of a reaction raw material included in the reaction fluid so as to produce a necessary substance. Japanese Translation of PCT International Application No. 2003-519563 (Patent Literature 1) discloses a reactor including a plurality of plates including flow channels through which a gas mixture which is a reaction fluid as a first fluid flows, and a plurality of tubes through which a gas mixture which is another reaction fluid as a second fluid flows. The plural plates include a plurality of rectangular plates and a plurality of corrugated plates alternately stacked on one another.

Patent Literature 1 also discloses, in addition to the reactor described above, a heat exchanger for preliminarily heating gas, which is externally supplied, before being introduced to the reactor so as to serve as a part of a chemical process. A heating source for the heat exchanger is high-temperature production gas containing a product produced in the reactor. The high-temperature fluid containing the product produced in the reactor is used for the preheating in the heat exchanger provided independently of the reactor.

SUMMARY

The chemical process including the stacked-type reactor is presumed to use a high-temperature fluid containing a product produced in the reactor for the preheating in the heat exchanger provided independently of the reactor. However, it may be difficult to effectively use the high-temperature fluid in view of exergy if a temperature necessary for the preheating is lower than the temperature of the high-temperature fluid.

An object of the present disclosure is to provide a reactor having the advantage of effective use of a high-temperature fluid containing a product.

A reactor according to an aspect of the present disclosure includes a first heat transfer body including a reaction flow channel through which a reaction fluid flows, a second heat transfer body stacked on the first heat transfer body, and including a heat medium flow channel through which a heat medium flows and a product flow channel through which a product flows that is produced in the reaction flow channel by a heat exchange between the reaction fluid and the heat medium, and a product communication part including a communication space through which the product flows from the reaction flow channel to the product flow channel.

In the reactor described above, the reaction flow channel may include a plurality of main flow parts, and the product flow channel may include at least one main flow part with the number fewer than the number of the main flow parts in the reaction flow channel. The at least one main flow part in the product flow channel may be located closer to a side surface of the second heat transfer body than at least one main flow part in the heat medium flow channel in a direction in which the respective main flow parts are arranged parallel to each other. The heat medium flow channel may include a plurality of main flow parts, and the product flow channel may include at least one main flow part with the number fewer than the number of the main flow parts in the heat medium flow channel. The product flow channel may be arranged parallel to the heat medium flow channel. An opening on an inlet side of the product flow channel may be open in a direction common to an opening on an outlet side of the reaction flow channel. The opening on the inlet side of the product flow channel may be aligned in a line common to the opening on the outlet side of the reaction flow channel in a stacked direction of the first heat transfer body and the second heat transfer body. A part of an inner wall of the product communication part may include a part of a side surface of the first heat transfer body including the opening on the outlet side of the reaction flow channel and a part of a side surface of the second heat transfer body including the opening on the inlet side of the product flow channel. An opening on an outlet side of the product flow channel may be open in a direction common to the opening on the inlet side of the product flow channel.

DESCRIPTION OF THE EMBODIMENTS

Figure 1:
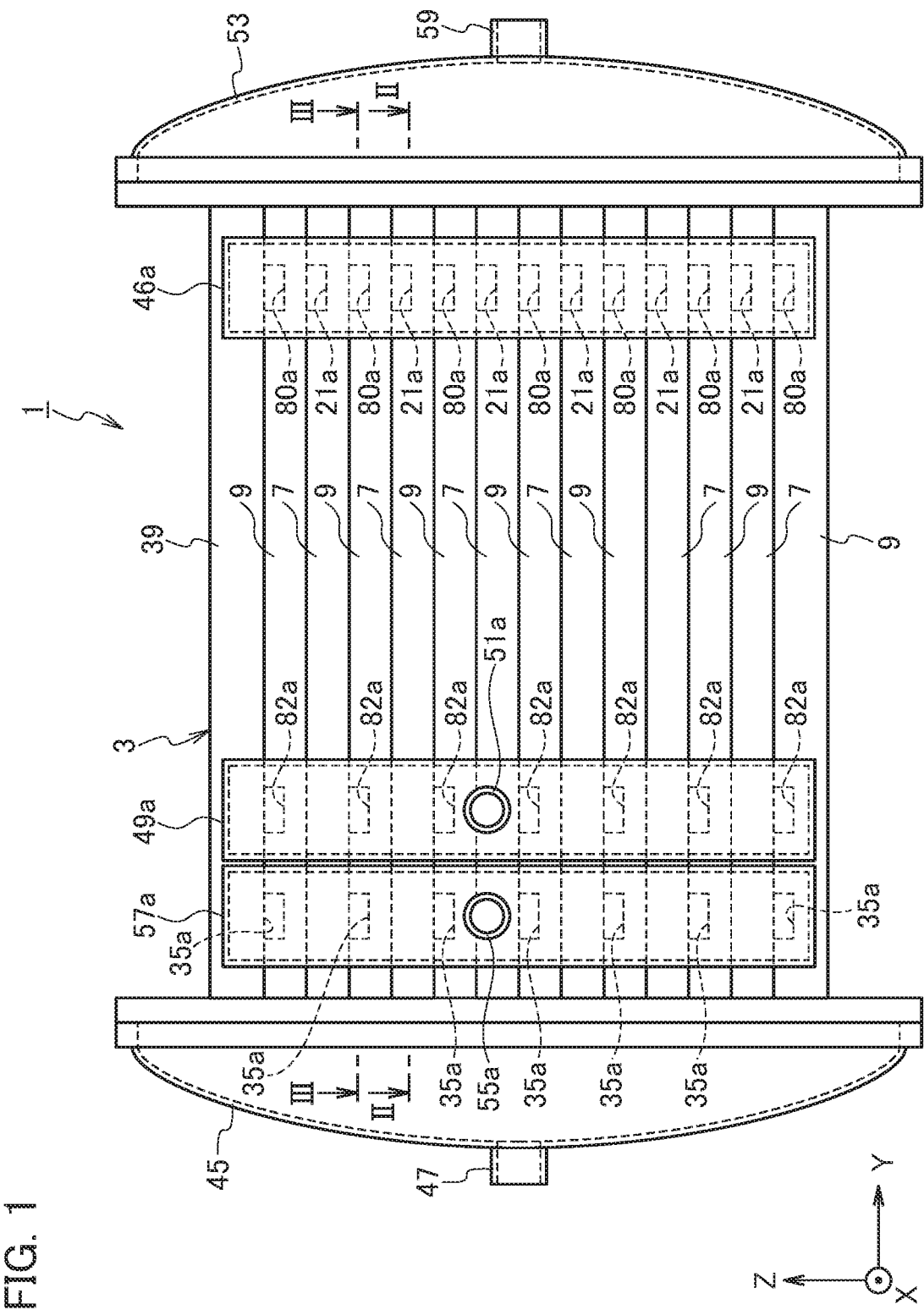
FIG. 1 is a side view showing a structure of a reactor according to an embodiment of the present disclosure.

Embodiments according to the present disclosure will be described in detail below with reference to the drawings. The following dimensions, materials, and specific numerical values described in the respective embodiments are indicated for illustration purposes, and the present disclosure is not intended to be limited thereto unless otherwise specified. The elements having substantially the same functions and structures illustrated below are designated by the same reference numerals, and overlapping explanations are not made below. The elements described below but not related directly to the present disclosure are not shown in the drawings. In the following explanations of the drawings, a stacking direction is defined as a Z-axis, an extending direction of each of reaction flow channels and heat medium flow channels on a plane perpendicular to the Z-axis is defined as a Y-axis, and a direction perpendicular to the Y-axis is defined as an X-axis.

FIG. 1 is a side view showing a structure of a reactor 1 according to the present embodiment. The reactor 1 uses a heat exchange between a reaction fluid M and a heat medium HC to produce a product P. The reaction fluid M is a gas or liquid fluid containing a reaction raw material as a reactant. The reaction fluid M is herein illustrated with raw material gas as an example. The product P is a substance produced by a thermal reaction of the reaction raw material. The thermal reaction in the present embodiment is an endothermic reaction. The heat medium HC is illustrated herein with high-temperature gas as an example.

The reactor 1 includes a heat exchange unit 3, a reaction fluid introduction part 45, a product communication part 46, a product recovery part 49, a heat medium introduction part 53, and a heat medium recovery part 57.

The heat exchange unit 3 executes a heat exchange between the reaction fluid M and the heat medium HC to promote the thermal reaction of the reaction raw material contained in the reaction fluid M. The heat exchange unit 3 includes a first heat transfer body 7, a second heat transfer body 9, and a third heat transfer body 39 stacked on one another. The first heat transfer body 7, the second heat transfer body 9, and the third heat transfer body 39 are each a plate-like member made of a heat transfer material having thermal resistance. The first heat transfer body 7, the second heat transfer body 9, and the third heat transfer body 39 have the same area on the stacked surface. The heat exchange unit 3 in the present embodiment includes a plurality of first heat transfer bodies 7 and a plurality of second heat transfer bodies 9.

Figure 2:
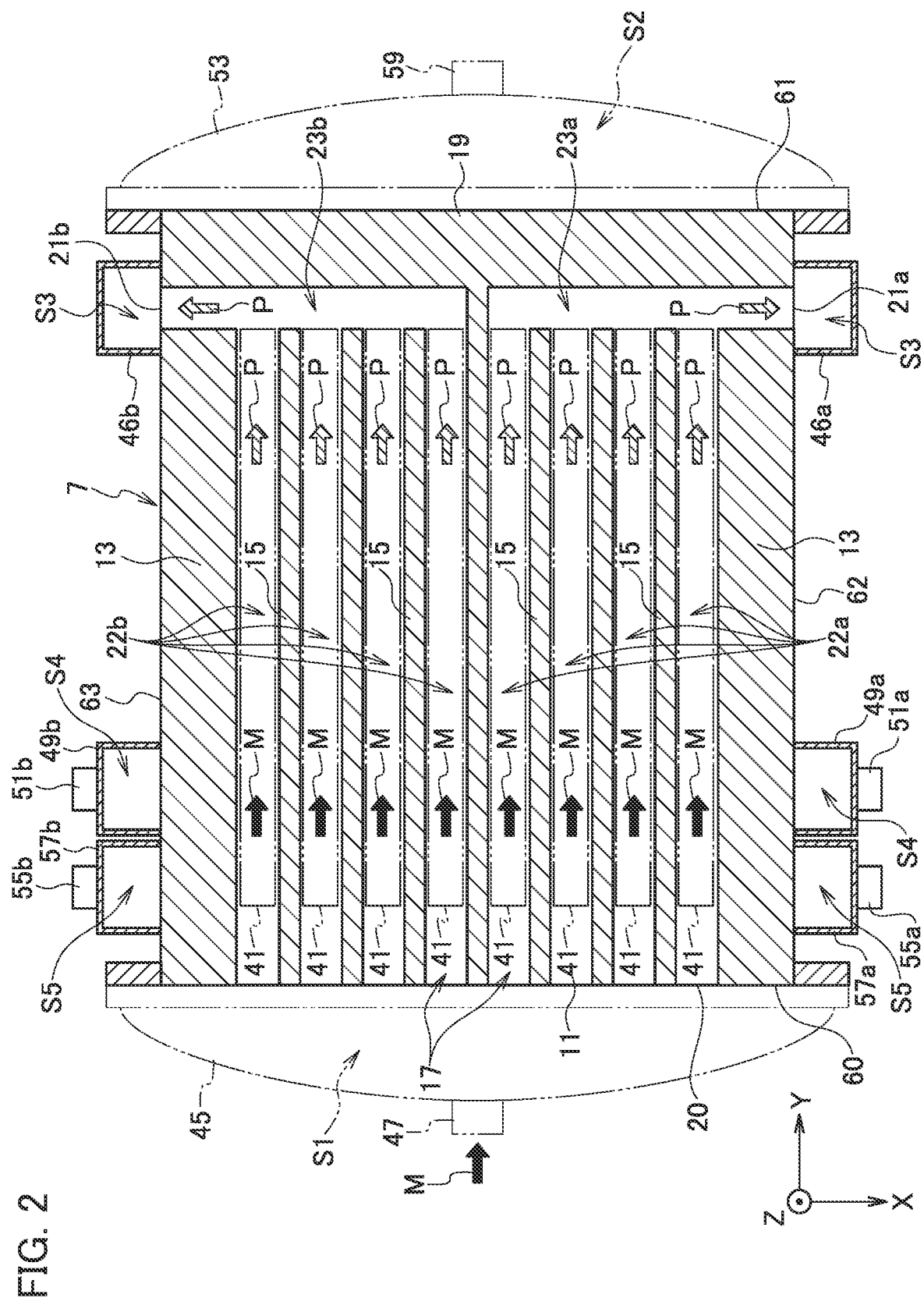
FIG. 2 is a cross-sectional plan view showing a part including a first heat transfer body in the reactor according to the embodiment of the present disclosure.

The first heat transfer bodies 7 each include reaction flow channels 17 through which the reaction fluid M or the product P flows (refer to FIG. 2). The second heat transfer bodies 9 each include heat medium flow channels 31 through which the heat medium HC flows, and a product flow channel 70 through which the product P produced in the reaction flow channels 17 of the respective first heat transfer bodies 7 flows (refer to FIG. 3). The heat exchange unit 3 in the present embodiment has a counter flow-type structure in which the reaction fluid M flowing through main flow parts in the reaction flow channels 17 and the heat medium HC flowing through main flow parts in the heat medium flow channels 31 flow in the directions opposite to each other.

FIG. 2 is a cross-sectional plan view of the reactor 1 corresponding to the cross section taken along line II-II shown in FIG. 1. FIG. 2 illustrates a structure and a shape of a part including the first heat transfer body 7 in the reactor 1.

The reaction flow channels 17 include a plurality of first flow channels 22 and a first joint flow channel 23. The first flow channels 22 include reaction regions in which the reaction raw material contained in the reaction fluid M is caused to receive heat supplied from the heat medium HC flowing through the heat medium flow channels 31 to induce the endothermic reaction. The first flow channels 22 are grooves corresponding to the main flow parts in the reaction flow channels 17 and having a rectangular shape in cross section with the upper side open in the Z direction. According to the present embodiment, the respective first flow channels 22 extend straight in the Y direction, and are arranged at regular intervals in the X direction. One end of the respective first flow channels 22 is open on a first side surface 60 of the heat exchange unit 3 including one side surface of the respective first heat transfer bodies 7. The one end of the respective first flow channels 22 open on the first side surface 60 serves as a first introduction port 20 from which the reaction fluid M is introduced. The other end of the respective first flow channels 22 communicates with the first joint flow channel 23 toward a second side surface 61 of the heat exchange unit 3 including the other side surface of the respective first heat transfer bodies 7. FIG. 2 illustrates the case in which the number of the first flow channels 22 is eight as an example. The number of the first flow channels 22 is not limited to the above case, and may be increased such that the width of the respective grooves is reduced.

The first heat transfer bodies 7 each include a first base 11, two first side walls 13, a plurality of first interposition walls 15, and a first partition wall 19. The first base 11 is a plate portion covering the entire X-Y plane of the respective first heat transfer bodies 7. The first side walls 13 are wall portions provided at the respective ends on both right and left sides in the X direction perpendicular to the extending direction of the first flow channels 22 on one of the main surfaces of the first base 11. The respective first interposition walls 15 are wall portions interposed between the two first side walls 13 on one of the main surfaces of the first base 11 and arranged at regular intervals parallel to the first side walls 13. The first partition wall 19 extends in the X direction perpendicular to the extending direction of the first flow channels 22 toward the second side surface 61 on one of the main surfaces of the first base 11. The first flow channels 22, if extending to reach the second side surface 61, would be brought into contact with a second introduction space S2 in which the heat medium HC is introduced. The first partition wall 19 blocks the first flow channels 22 so as not to reach the second introduction space S2, and changes the flowing direction of the product P or the reaction fluid M having passed through the respective first flow channels 22.

The first joint flow channel 23 is a groove having a rectangular shape in cross section with the upper side open in the Z direction, and extends straight along the inner side surface of first partition wall 19. The first side walls 13 each have a first communication port 21 for discharging the product P to the outside of the respective first heat transfer bodies 7. The first communication port 21 corresponds to an opening on the outlet side of the reaction flow channels 17. One end of the first joint flow channel 23 communicates with the first communication port 21. The first joint flow channel 23 in the present embodiment includes a first joint flow channel 23a and another first joint flow channel 23b provided independently of each other. The end of the first joint flow channel 23a communicates with the first communication port 21a provided on one of the first side walls 13. The end of the first joint flow channel 23b communicates with the first communication port 21b provided on the other first side wall 13.

The first communication port 21a is open to the outside on a third side surface 62. The third side surface 62 is one of the side surfaces of the Y-Z plane perpendicular to the first side surface 60 and the second side surface 61 of the heat exchange unit 3. The first communication port 21b is open to the outside on a fourth side surface 63. The fourth side surface 63 is the other side surface of the Y-Z plane in the heat exchange unit 3. The fourth side surface 63 is located on the opposite side of the third side surface 62. Since the heat exchange unit 3 has the configuration in which the first heat transfer bodies 7 and the second heat transfer bodies 9 are stacked on one another, the respective four side surfaces of the first heat transfer bodies 7 correspond to a part of each of the first side surface 60, the second side surface 61, the third side surface 62, and the fourth side surface 63 that are the four side surfaces of the heat exchange unit 3.

As illustrated in FIG. 2, the first flow channels 22a, which are half of the first flow channels 22, located toward the third side surface 62 communicate with the first joint flow channel 23a. The first flow channels 22b, which are the remaining half of the first flow channels 22, located toward the fourth side surface 63 communicate with the first joint flow channel 23b.

The reaction raw material not having contributed to the production of the product P may remain in the high-temperature fluid discharged to the outside via the first communication port 21*a* or the first communication port 21*b*, in addition to the product P produced in the reaction flow channels 17.

Figure 3:
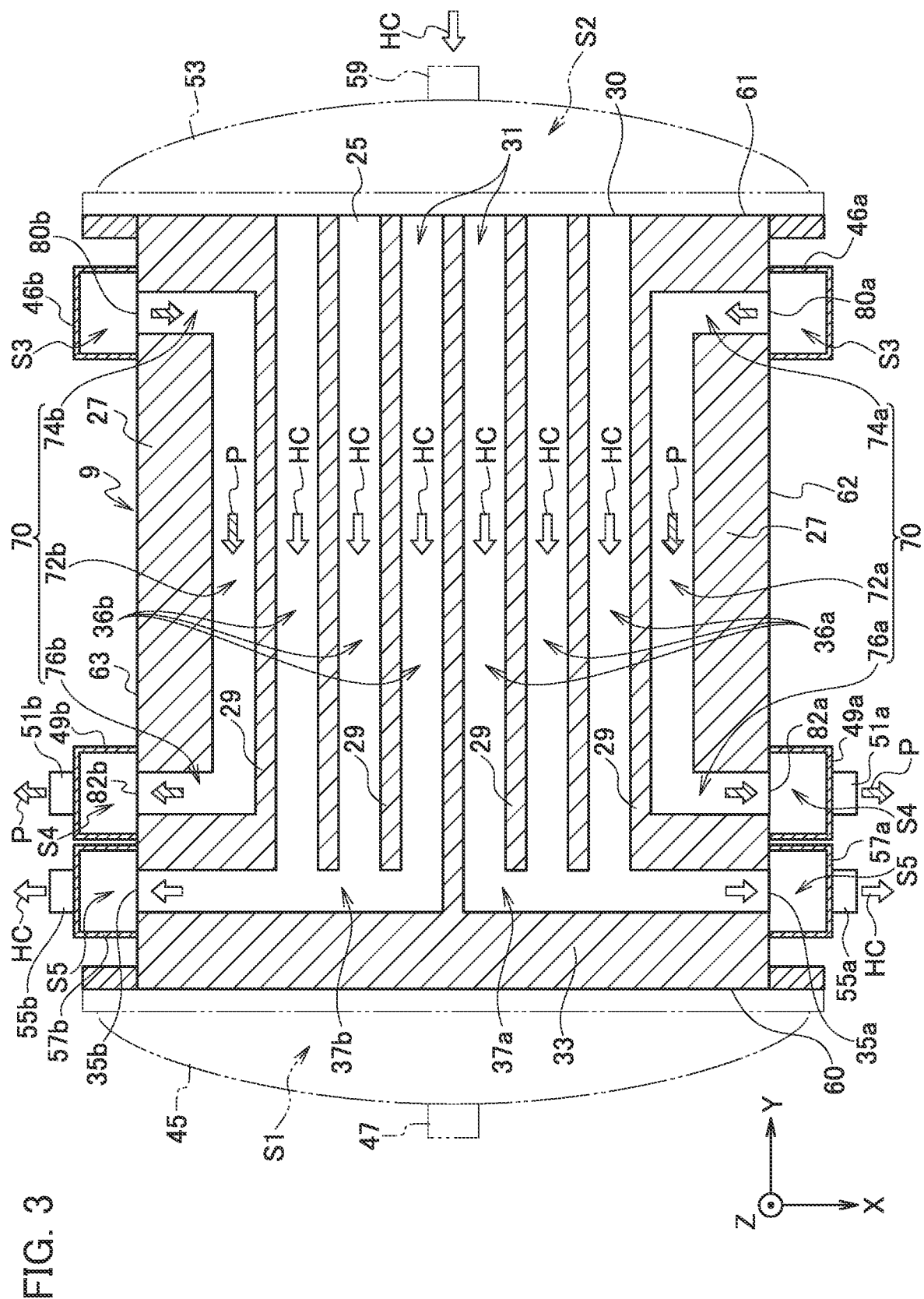
FIG. 3 is a cross-sectional plan view showing a part including a second heat transfer body in the reactor according to the embodiment of the present disclosure.

FIG. 3 is a cross-sectional plan view of the reactor 1 corresponding to the cross section taken along III-III shown in FIG. 1. FIG. 3 illustrates a structure and a shape of a part including the second heat transfer body 9 in the reactor 1.

The heat medium flow channels 31 include a plurality of second flow channels 36 and a second joint flow channel 37. The heat medium HC flowing through the second flow channels 36 supplies heat to the respective first heat transfer bodies 7 stacked on the respective second heat transfer bodies 9. The second flow channels 36 are grooves corresponding to the main flow parts in the heat medium flow channels 31 and having a rectangular shape in cross section with the upper side open in the Z direction. According to the present embodiment, the respective second flow channels 36 extend straight in the Y direction, and are arranged at regular intervals in the X direction. One end of the respective second flow channels 36 is open on the second side surface 61. The one end of the respective second flow channels 36 open on the second side surface 61 serves as a second introduction port 30 from which the heat medium HC is introduced. The other end of the respective second flow channels 36 communicates with the second joint flow channel 37 toward the first side surface 60. FIG. 3 illustrates the case in which the number of the second flow channels 36 is six as an example. The number of the second flow channels 36 is not limited to the above case, and may be increased depending on the number of the first flow channels 22 provided in the respective first heat transfer bodies 7, for example.

The second heat transfer bodies 9 each include a second base 25, two second side walls 27, a plurality of second interposition walls 29, and a second partition wall 33. The second base 25 is a plate portion covering the entire X-Y plane of the respective second heat transfer bodies 9. The second side walls 27 are wall portions provided at the respective ends on both right and left sides in the X direction perpendicular to the extending direction of the second flow channels 36 on one of the main surfaces of the second base 25. The respective second interposition walls 29 are wall portions interposed between the two second side walls 27 on one of the main surfaces of the second base 25 and arranged at regular intervals parallel to the second side walls 27. The second partition wall 33 extends in the X direction perpendicular to the extending direction of the second flow channels 36 toward the first side surface 60 on one of the main surfaces of the second base 25. The second flow channels 36, if extending to reach the first side surface 60, would be brought into contact with a first introduction space S1 in which the reaction fluid M is introduced. The second partition wall 33 blocks the second flow channels 36 so as not to reach the first introduction space S1, and changes the flowing direction of the heat medium HC passing through the respective second flow channels 36.

The second joint flow channel 37 is a groove having a rectangular shape in cross section with the upper side open in the Z direction, and extends straight along the inner side surface of the second partition wall 33. The second side walls 27 each have a first drain port 35 for discharging the heat medium HC to the outside of the respective second heat transfer bodies 9. One end of the second joint flow channel 37 communicates with the first drain port 35. The second joint flow channel 37 in the present embodiment includes a second joint flow channel 37*a* and another second joint flow channel 37*b* provided independently of each other. The end of the second joint flow channel 37*a* communicates with the first drain port 35*a* provided on one of the second side walls 27. The end of the second joint flow channel 37*b* communicates with the first drain port 35*b* provided on the other second side wall 27.

The first drain port 35*a* is open to the outside on the third side surface 62. The first drain port 35*b* is open to the outside on the fourth side surface 63. Since the heat exchange unit 3 has the configuration in which the first heat transfer bodies 7 and the second heat transfer bodies 9 are stacked on one another, the respective four side surfaces of the second heat transfer bodies 9 correspond to a part of each of the first side surface 60, the second side surface 61, the third side surface 62, and the fourth side surface 63 that are the four side surfaces of the heat exchange unit 3.

As illustrated in FIG. 3, the second flow channels 36*a*, which are half of the second flow channels 36, located toward the third side surface 62 communicate with the second joint flow channel 37*a*. The second flow channels 36*b*, which are the remaining half of the second flow channels 36, located toward the fourth side surface 63 communicate with the second joint flow channel 37*b*.

The product flow channel 70 includes a third flow channel 72, an introduction flow channel 74, and a drain flow channel 76. The product P discharged from the first communication ports 21 of the respective first heat transfer bodies 7 is introduced via the product communication part 46 to flow into the third flow channel 72. The third flow channel 72 is a groove corresponding to a main flow part in the product flow channel 70 and having a rectangular shape in cross section with the upper side open in the Z direction. The present embodiment includes two product flow channels 70 in the respective second heat transfer bodies 9. One of the product flow channels 70 includes a third flow channel 72*a*, an introduction flow channel 74*a*, and a drain flow channel 76*a*. The other product flow channel 70 includes a third flow channel 72*b*, an introduction flow channel 74*b*, and a drain flow channel 76*b*. The two product flow channels 70 are arranged symmetrically about the Y axis.

The respective third flow channels 72 are located closer to the respective side surfaces of the second heat transfer bodies 9 than the second flow channels 36 of the heat medium flow channels 31. In particular, the third flow channel 72*a* is located closer to the third side surface 62 than the second flow channels 36*a*. The third flow channel 72*b* is located closer to the fourth side surface 63 than the second flow channels 36*b*. The third flow channels 72 in the present embodiment extend straight in the Y direction in the same manner as the second flow channels 36. The third flow channels 72 are thus arranged parallel to the second flow channels 36. A gap between the respective third flow channels 72 and the second flow channels 36 that are located closest to the respective third flow channels 72 may be the same as the gap between the respective second flow channels 36 adjacent to each other.

The number of the third flow channels 72 is smaller than the number of the second flow channels 36. FIG. 3 illustrates the case in which one third flow channel 72 is allotted to one product flow channel 70. The number of the third flow channels 72 allotted to each product flow channel 70 is only required to be at least one, and may be two or more.

The flowing direction of the product P in the respective third flow channels 72 conforms to the flowing direction of the heat medium HC in the respective second flow channels 36. In the present embodiment, the product P flows through the third flow channels 72 in the Y direction from the second side surface 61 side to the first side surface 60 side.

The respective introduction flow channels 74 are grooves having the same shape in cross section as the respective third flow channels 72. As described above, the flowing direction of the product P in the third flow channels 72 is defined as the direction from the second side surface 61 side to the first side surface 60 side. The respective introduction flow channels 74 extend straight along and adjacent to the second side surface 61. The side walls 27 each have a second communication port 80 for introducing the product P to the inside of the respective second heat transfer bodies 9. The second communication port 80 corresponds to an opening on the inlet side of the respective product flow channels 70. One end of the respective introduction flow channels 74 communicates with the respective third flow channels 72. The other end of the respective introduction flow channels 74 communicates with the second communication port 80.

The present embodiment includes the two second communication ports 80, which are a second communication port 80a communicating with the introduction flow channel 74a of one of the product flow channels 70, and a second communication port 80b communicating with the introduction flow channel 74b of the other product flow channel 70. The second communication port 80a is open to the outside on the third side surface 62. The second communication port 80b is open to the outside on the fourth side surface 63.

The side surfaces of the respective second heat transfer bodies 9 provided with the second communication ports 80 face in the same direction as the side surfaces of the respective first heat transfer bodies 7 provided with the first communication ports 21. For example, the first communication port 21a and the second communication port 80a are open to the outside on the third side surface 62 of the heat exchange unit 3 to face in the same direction. Similarly, the first communication port 21b and the second communication port 80b are open to the outside on the fourth side surface 63 of the heat exchange unit 3 to face in the same direction. The respective side surfaces of the first heat transfer bodies 7 and the respective side surfaces of the second heat transfer bodies 9 are not necessarily on the same plane, such as on the third side surface 62 or the fourth side surface 63, but are only required to face in the same direction. For example, a case can be presumed in which the plane shape of the respective first heat transfer bodies 7 does not conform to the plane shape of the respective second heat transfer bodies 9.

According to the present embodiment, the first communication ports 21 provided at the first heat transfer bodies 7 and the second communication ports 80 provided at the second heat transfer bodies 9 are aligned in the same line in the Z direction that is the stacked direction in which the first heat transfer bodies 7 and the second heat transfer bodies 9 are stacked on one another. For example, as shown in FIG. 1, the respective first communication ports 21a and the respective second communication ports 80a are aligned in the same line in the Z direction on the third side surface 62 side. Similarly, the respective first communication ports 21b and the respective second communication ports 80b are aligned in the same line in the Z direction on the fourth side surface 63 side.

The discharge flow channels 76 are grooves having the same shape in cross section as the respective third flow channels 72 as in the case of the introduction flow channels 74. The respective discharge flow channels 76 extend straight along and near the first side surface 60 on the opposite side of the introduction flow channels 74 to follow the definition of the flowing direction of the product P in the third flow channels 72. As described above, the respective second heat transfer bodies 9 include the second joint flow channels 37 as part of the heat medium flow channels 31. The discharge flow channels 76 are thus provided parallel to the second joint flow channels 37 at the position closer to the second side surface 61 than the second joint flow channels 37 so as not to overlap with the second joint flow channels 37. The side walls 27 each have a second drain port 82 for discharging the product P to the outside of the respective second heat transfer bodies 9. The second drain port 82 corresponds to an opening on the outlet side of the respective product flow channels 70. One end of the respective drain flow channels 76 communicates with the respective third flow channels 72. The other end of the respective drain flow channels 76 communicates with the second drain port 82.

The present embodiment includes the two second drain ports 82, which are a second drain port 82a communicating with the drain flow channel 76a of one of the product flow channels 70, and a second drain port 82b communicating with the drain flow channel 76b of the other product flow channel 70. The second drain port 82a is open to the outside on the third side surface 62. The second drain port 82b is open to the outside on the fourth side surface 63. The second drain port 82a and the second communication port 80a for one of the product flow channels 70 are located on the same side surface of the respective second heat transfer bodies 9 that corresponds to the third side surface 62. Similarly, the second drain port 82b and the second communication port 80b for the other product flow channel 70 are located on the same side surface of the respective second heat transfer bodies 9 that corresponds to the fourth side surface 63.

According to the present embodiment, the respective third flow channels 72 as a part of the respective product flow channels 70 are arranged parallel to the respective second flow channels 36 as a part of the respective heat medium flow channels 31. The respective introduction flow channels 74 and drain flow channels 76 each serving as a part of the product flow channels 70 are also arranged parallel to the respective second joint flow channels 37 as a part of the heat medium flow channels 31. The product flow channels 70 and the heat medium flow channels 31 are thus arranged parallel to each other.

In a case in which each product flow channel 70 includes two or more third flow channels 72, a gap between the respective third flow channels 72 adjacent to each other may be set to be the same as the gap between the respective second flow channels 36 adjacent to each other. In the case in which each product flow channel 70 includes two or more third flow channels 72, one end of the respective third flow channels 72 may be configured to communicate with the single introduction flow channel 74, and the other end of the respective third flow channels 72 may be configured to communicate with the single drain flow channel 76.

The third heat transfer body 39 is a lid body arranged on the uppermost side of the heat exchange unit 3 in the Z direction. The second heat transfer bodies 9 and the first heat transfer bodies 7 are alternately connected and stacked on one another below the third heat transfer body 39, so as to fabricate the heat exchange unit 3 as a connected body or a stacked body. The first flow channels 22 are adjacent and parallel to the second flow channels 36 or the third flow channels 72 via the first base 11 or the second base 25. Upon the assembly of the heat exchange unit 3, the respective members are fixed to each other by a bonding method such as tungsten inert gas (TIG) welding or diffusion bonding, so as to avoid a reduction in heat transfer efficiency derived from poor contact between the respective members.

The heat transfer material used for the respective elements included in the heat exchange unit 3 is preferably thermally-resistant metal such as an iron alloy or a nickel alloy. More particularly, the thermally-resistant alloy may be an iron alloy such as stainless steel, or a nickel alloy such as Inconel alloy 625 (registered trademark), Inconel alloy 617 (registered trademark), and Haynes alloy 230 (registered trademark). These preferable heat transfer materials have durability or corrosion resistance with respect to a fluid that can be used for promoting the reaction in the first flow channels 22 or used as the heat medium HC, but the present embodiment is not limited to these materials. Alternatively, the heat transfer material may be iron-based plated steel, metal covered with thermally-resistant resin such as fluororesin, or carbon graphite.

The heat exchange unit 3 is composed of at least a pair of a single first heat transfer body 7 and a single second heat transfer body 9, but the use of a larger number of the respective heat transfer bodies as illustrated in the respective drawings is preferable in order to improve the heat exchange performance. The number of the first flow channels 22 provided in each first heat transfer body 7 and the number of the second flow channels 36 provided in each second heat transfer body 9 may be determined as appropriate, and may be changed in view of the designing conditions or the heat transfer efficiency of the heat exchange unit 3. The reactor 1 may be covered and surrounded by a housing or a heat insulator so as to reduce heat radiation from the heat exchange unit 3 to avoid heat loss.

The respective first flow channels 22 may be provided with a catalyst body 41. A catalyst included in the catalyst body 41 mainly contains active metal effective in promotion of the endothermic reaction of the reaction raw material, and is selected as appropriate from substances suitable for the promotion of the reaction based on a synthesis reaction induced in the heat exchange unit 3. Examples of active metals as a catalytic component include nickel (Ni), cobalt (Co), iron (Fe), platinum (Pt), ruthenium (Ru), rhodium (Rh), and palladium (Pd). Several kinds of active metals may be combined together.

The catalyst body 41 is prepared such that the catalyst is supported on a structure member, for example. The material used for the structure member is selected from thermally-resistant metals which can be molded and support the catalyst. The catalyst body 41 may have a shape of a corrugated plate pleated in a wave-like form or a shape of sharp bellows in cross section so as to increase the contact area with the reaction fluid M. Examples of thermally-resistant metals include iron (Fe), chromium (Cr), aluminum (Al), yttrium (Y), cobalt (Co), nickel (Ni), magnesium (Mg), titanium (Ti), molybdenum (Mo), tungsten (W), niobium (Nb), tantalum (Ta), and a thermally-resistant alloy mainly containing one of or some of these metals. The catalyst body 41 may be obtained such that a thin plate structure made of a thermally-resistant alloy such as Fecralloy (registered trademark) is molded. The catalyst may be supported directly on the structure member by surface modification or the like, or may be supported indirectly on the structure member via a carrier. Practically, the use of the carrier facilitates the process of supporting the catalyst. The carrier is selected as appropriate from materials having durability without impeding the promotion of the reaction and capable of supporting the catalyst effectively, in view of the reaction induced in the heat exchange unit 3. The carrier may be a metal oxide such as alumina ($Al_2O_3$), titania ($TiO_2$), zirconia ($ZrO_2$), ceria ($CeO_2$), or silica ($SiO_2$). The respective metal oxides may be used singly, or some of these metal oxides may be selected and combined together. Examples of supporting methods using the carrier include a process of forming a mixed layer of the catalyst and the carrier on the surface of the structure member molded, and a process of forming a carrier layer and then supporting the catalyst on the carrier layer by surface modification or the like.

Although not illustrated, the respective second flow channels 36 may be provided with a heat transfer promoting body for increasing the contact area with the heat medium HC so as to promote the heat transfer between the heat medium HC and the respective second heat transfer bodies 9. The heat transfer promoting body may have a corrugated plate-like shape so as to ensure a sufficient contact area with the respective second heat transfer bodies 9. A heat transfer material used for the heat transfer promoting body may be metal such as aluminum, copper, stainless steel, and iron-based plated copper.

The reaction fluid introduction part 45 is a first lid body for distributing the reaction fluid M into the respective first introduction ports 20. The reaction fluid introduction part 45 has a concave shape, and covers the first side surface 60 of the heat exchange unit 3 on which the respective first introduction ports 20 of the reaction flow channels 17 are open so as to define the first introduction space S1 together with the heat exchange unit 3. The reaction fluid introduction part 45 is detachable or openable with respect to the heat exchange unit 3. The detachable reaction fluid introduction part 45 allows the operator to insert or remove the catalyst body 41 into or from the respective reaction flow channels 17, for example. The reaction fluid introduction part 45 includes a first introduction pipe 47 from which the reaction fluid M is externally introduced to the inside. The first introduction pipe 47 is opposed to substantially the middle of the first side surface 60 on the X-Z plane, and is connected to the reaction fluid introduction part 45 in the open direction of the respective first introduction ports 20.

The product communication part 46 is a first duct part having a communication space S3 for allowing the product P to flow from the reaction flow channels 17 to the product flow channels 70. According to the present embodiment, the product communication part 46 has a box-like shape with one surface open, and is arranged on the side surface of the heat exchange unit 3 such that the first communication ports 21 of the first heat transfer bodies 7 and the second communication ports 80 of the second heat transfer bodies 9 are covered by the open surface. In particular, a part of the respective side surfaces of the first heat transfer bodies 7 including the first communication ports 21 and a part of the respective side surfaces of the second heat transfer bodies 9 including the second communication ports 80 serve as a part of the inner wall of the product communication part 46. The present embodiment includes the two product communication parts 46 together with the first communication ports 21 and the second communication ports 80 provided on both the third side surface 62 and the fourth side surface 63. One product communication part 46a is arranged on the third side surface 62 such that the respective first communication ports 21a and the respective second communication ports 80a are covered by the open surface. The other product communication part 46b is arranged on the fourth side surface 63 such that the respective first communication ports 21b and the respective second communication ports 80b are covered by the open surface.

The product recovery part 49 is a second duct part having a first recovery space S4 for recovering the product P having passed through the product flow channels 70. According to the present embodiment, the product recovery part 49 has a box-like shape with one surface open, and is arranged on the side surface of the heat exchange unit 3 such that the second drain ports 82 of the second heat transfer bodies 9 are covered by the open surface. In particular, a part of the respective side surfaces of the second heat transfer bodies 9 including the second drain ports 82 serves as a part of the inner wall of the product recovery part 49. The present embodiment includes the two product recovery parts 49 together with the second drain ports 82 provided on both the third side surface 62 and the fourth side surface 63. One product recovery part 49$a$ is arranged on the third side surface 62 such that the respective second drain ports 82$a$ are covered by the open surface. The other product recovery part 49$b$ is arranged on the fourth side surface 63 such that the respective second drain ports 82$b$ are covered by the open surface. The product recovery parts 49 each include a first drain pipe 51 through which the product P is discharged to the outside of the reactor 1.

The heat medium introduction part 53 is a second lid body for distributing the heat medium HC into the respective second introduction ports 30. The heat medium introduction part 53 has a concave shape, and covers the second side surface 61 of the heat exchange unit 3 on which the respective second introduction ports 30 of the heat medium flow channels 31 are open so as to define the second introduction space S2 together with the heat exchange unit 3. The heat medium introduction part 53 is detachable or openable with respect to the heat exchange unit 3. The detachable heat medium introduction part 53 allows the operator to insert or remove the heat transfer promoting body into or from the respective heat medium flow channels 31, for example. The heat medium introduction part 53 includes a second introduction pipe 59 from which the heat medium HC is externally introduced into the inside. The second introduction pipe 59 is opposed to substantially the middle of the second side surface 61 on the X-Z plane, and is connected to the heat medium introduction part 53 in the open direction of the respective second introduction ports 30. The heat medium introduction part 53 can distribute the heat medium HC introduced from the single second introduction pipe 59 into the respective second introduction ports 30.

The heat medium recovery part 57 is a third duct part having a second recovery space S5 for recovering the heat medium HC having passed through the heat medium flow channels 31. According to the present embodiment, the heat medium recovery part 57 has a box-like shape with one surface open, and is arranged on the side surface of the heat exchange unit 3 such that the first drain ports 35 of the second heat transfer bodies 9 are covered by the open surface. In particular, a part of the respective side surfaces of the second heat transfer bodies 9 including the first drain ports 35 serves as a part of the inner wall of the heat medium recovery part 57. The present embodiment includes the two heat medium recovery parts 57 together with the first drain ports 35 provided on both the third side surface 62 and the fourth side surface 63. One heat medium recovery part 57$a$ is arranged on the third side surface 62 such that the respective first drain ports 35$a$ are covered by the open surface. The other heat medium recovery part 57$b$ is arranged on the fourth side surface 63 such that the respective first drain ports 35$b$ are covered by the open surface. The heat medium recovery parts 57 each include a second drain pipe 55 through which the heat medium HC is discharged to the outside of the reactor 1.

The heat exchange unit 3 may be any of a liquid-liquid heat exchanger, a gas-gas heat exchanger, and a gas-liquid heat exchanger. The reaction fluid M and the heat medium HC may be either gas or liquid. Examples of endothermic reactions causing synthesis induced in the heat exchange unit 3 include a steam reforming reaction of methane as represented by the following chemical equation (1), and a dry reforming reaction of methane as represented by the following chemical equation (2). The reaction fluid used in these reactions is in a gas state.

$$CH_4 + H_2O \rightarrow 3H_2 + CO \quad (1)$$

$$CH_4 + CO_2 \rightarrow 2H_2 + 2CO \quad (2)$$

The heat medium HC is preferably a substance not corroding the constituent materials of the heat exchange unit 3, and may be a gaseous substance such as flammable gas or heating air when the heat medium HC is the high-temperature gas as described in the present embodiment. The heat medium HC may also be a liquid substance such as water or oil. The gaseous substance used as the heat medium HC is easier to handle than the liquid medium.

Next, the operation of the reactor 1 according to the present embodiment is described below.

The reaction fluid M introduced into the reaction fluid introduction part 45 through the first introduction pipe 47 is distributed into the respective first introduction ports 20 via the first introduction space S1. A temperature of the reaction fluid M upon the introduction into the first introduction ports 20 is 600° C., for example. The reaction fluid M is then introduced into the respective reaction flow channels 17 through the first introduction ports 20 so as to flow through the first flow channels 22 in the Y direction.

The heat medium HC introduced into the heat medium introduction part 53 through the second introduction pipe 59 is distributed into the respective second introduction ports 30 via the second introduction space S2. A temperature of the heat medium HC upon the introduction into the second introduction ports 30 is 870° C., for example. The heat medium HC is then introduced into the respective heat medium flow channels 31 through the second introduction ports 30 so as to flow through the second flow channels 36. While the present embodiment illustrates the case in which the second flow channels 36 are arranged in the Y direction to conform to the first flow channels 22, the flowing direction of the heat medium HC is opposite to the flowing direction of the reaction fluid M.

The flow of each of the reaction fluid M and the heat medium HC leads to the heat exchange between the reaction fluid M and the heat medium HC so as to heat the reaction fluid M in the heat exchange unit 3. The reaction fluid M is caused to induce the endothermic reaction in the respective first flow channels 22 to produce the product P in cooperation with the reaction promoting effect by the catalyst body 41. The produced product P passes through the respective first joint flow channels 23 and is discharged through the respective first communication ports 21 to the communication space S3 in the respective product communication parts 46. A temperature of the product P upon the discharge from the first communication ports 21 is 850° ° C., for example. The temperature of the product P upon the discharge from the first communication ports 21 is herein synonymous with the temperature of the high-temperature fluid containing the product P discharged from the first communication ports 21.

The heat medium HC having passed through the second flow channels 36 and used for the heat exchange further passes through the respective second joint flow channels 37 and is discharged through the first drain ports 35 to the second recovery space S5 in the respective heat medium recovery parts 57. A temperature of the heat medium HC upon the discharge from the first drain ports 35 is 630° C., for example. The heat medium HC recovered in the respective second recovery spaces S5 is discharged to the outside of the reactor 1 through the respective second drain pipes 55.

The product P discharged to the respective communication spaces S3 through the first communication ports 21 is introduced to any of the product flow channels 70 via the second communication ports 80 communicating with the respective communication spaces S3 as in the case of the first communication ports 21. The product P discharged from the first communication ports 21 is immediately introduced to the second communication ports 80, and a temperature of the product P upon the introduction to the second communication ports 80 is thus substantially the same as the temperature upon the discharge from the first communication ports 21. The product P introduced to the product flow channels 70 passes through the introduction flow channels 74 so as to be introduced to the third flow channels 72. According to the present embodiment, the third flow channels 72 are arranged parallel to the second flow channels 36. The flowing direction of the product P in the third flow channels 72 is the same as the flowing direction of the heat medium HC flowing through the second flow channels 36. The product P having passed through the third flow channels 72 is discharged via the drain flow channels 76 to the first recovery spaces S4 in the product recovery parts 49 from the second drain ports 82. A temperature of the product P upon the discharge from the second drain ports 82 is 600° C., for example. The product P recovered in the respective first recovery spaces S4 is discharged to the outside of the reactor 1 through the respective first drain pipes 51.

As illustrated above, the third flow channels 72 are arranged parallel to the second flow channels 36 in the respective second heat transfer bodies 9, and are also arranged parallel to the first flow channels 22 of the reaction flow channels 17 in the respective first heat transfer bodies 7. The number of the third flow channels 72 is set to be smaller than the number of the second flow channels 36. Namely, the number of the third flow channels 72 provided in the second heat transfer bodies 9 is smaller than the number of the first flow channels 22 provided in the first heat transfer bodies 7. The amount of flow of the product P flowing through each third flow channel 72 is thus greater than the amount of flow of the reaction fluid M flowing through each first flow channel 22. The temperature of the product P flowing through the third flow channels 72 is kept at a high temperature, since the product P is introduced to the third flow channels 72 immediately after being discharged from the reaction flow channels 17 of the respective first heat transfer bodies 7. The heat exchange is thus induced in the heat exchange unit 3 not only between the heat medium HC flowing through the second flow channels 36 and the reaction fluid M flowing through the first flow channels 22, but also between the product P flowing through the third flow channels 72 and the reaction fluid M flowing through the first flow channels 22.

Next, the effects of the reactor 1 according to the present embodiment are described below.

The reactor 1 includes the first heat transfer bodies 7 each including the reaction flow channels 17 through which the reaction fluid M flows. The reactor 1 further includes the second heat transfer bodies 9 each stacked on the respective first heat transfer bodies 7 and including the heat medium flow channels 31 through which the heat medium HC flows, and the product flow channels 70 through which the product P flows that is produced in the reaction flow channels 17 by the heat exchange between the reaction fluid M and the heat medium HC. The reactor 1 further includes the product communication parts 46 each having the communication space S3 through which the product P passes from the reaction flow channels 17 toward the product flow channels 70.

The high-temperature fluid containing the product P produced in the reaction flow channels 17 and discharged from the reaction flow channels 17 is introduced to the product flow channels 70 via the respective product communication parts 46. Since the second heat transfer bodies 9 including the product flow channels 70 are alternately stacked on the first heat transfer bodies 7 including the reaction flow channels 17, the stacked body of the first heat transfer bodies 7 and the second heat transfer bodies 9 combined together can be considered to be the single heat exchange unit 3 as illustrated above. The product P after being produced in the reaction flow channels 17 is once discharged from the heat exchange unit 3, but is immediately returned to the same heat exchange unit 3 via the respective product communication parts 46.

The thermal reaction induced to produce the product P from the reaction fluid M is herein presumed to be the endothermic reaction. In addition, the flowing direction of the heat medium HC in the heat medium flow channels 31 is presumed to be opposite to the flowing direction of the reaction fluid M in the reaction flow channels 17, and the flowing direction of the product P in the product flow channels 70 is presumed to be the same as the flowing direction of the heat medium HC in the heat medium flow channels 31. The high-temperature fluid containing the product P flowing through the product flow channels 70 can also be used for the heat exchange with the reaction fluid M, more particularly, with the reaction fluid M for causing the reaction raw material contained in the reaction fluid M to induce the endothermic reaction, in the same manner as the heat medium HC flowing through the heat medium flow channels 31. Namely, not only the heat medium HC is used as a heat source used for the heat exchange with the reaction fluid M, but also the high-temperature fluid containing the product P can be used as part of the heat source used for the heat exchange with the reaction fluid M.

If the respective second heat transfer bodies 9 do not include the product flow channels 70, a prescribed amount of the heat medium HC needs to flow in the second heat transfer bodies 9. The second heat transfer bodies 9 according to the present embodiment, which include the product flow channels 70, can contribute to decreasing the supply amount of the heat medium HC to be used mainly for the heat exchange with the reaction fluid M by the extent that the product P is caused to flow in the second heat transfer bodies 9 to serve as part of the heat source used for the heat exchange. The reactor 1 thus can save the amount of use of energy necessary for the thermal reaction in the reactor 1.

The present embodiment as described above thus can provide the reactor 1 having the advantage of the effective use of the high-temperature fluid containing the product P.

The reactor 1 may have a configuration including the plural main flow parts of the reaction flow channels 17, in which the number of the main flow parts in the product flow channels 70 is smaller than the number of the main flow parts in the reaction flow channels 17.

The main flow parts in the reaction flow channels 17 are the first flow channels 22, for example. The main flow parts in the product flow channels 70 are the third flow channels 72, for example.

According to the reactor 1 as configured above, the amount of flow of the product P flowing through each third flow channel 72 is greater than the amount of flow of the reaction fluid M flowing through each first flow channel 22. The heat exchange thus can be made between the product P flowing through the respective third flow channels 72 and the reaction fluid M flowing through the respective first flow channels 22 more efficiently.

The reactor 1 may also have a configuration in which the respective main flow parts in the product flow channels 70 are located closer to the side surfaces of the respective second heat transfer bodies 9 than the main flow parts in the heat medium flow channels 31 in the direction in which the respective main flow parts are arranged parallel to each other.

The main flow parts in the heat medium flow channels 31 are the second flow channels 36, for example. The side surfaces of the respective second heat transfer bodies 9 in the direction in which the respective main flow parts are arranged parallel to each other each correspond to a part of either the third side surface 62 or the fourth side surface 63, for example. While the direction in which the main flow parts in the product flow channels 70 and the main flow parts in the heat medium flow channels 31 are arranged parallel to each other corresponds to the X direction in the drawings, the direction not only includes the direction in which the third flow channels 72 and the second flow channels 36 are arranged in parallel as illustrated in the respective drawings, but also includes a direction in which the respective flow channels are arranged not exactly parallel to each other.

According to the reactor 1 as configured above, the product flow channels 70, which are located on the outer side of the heat medium flow channels 31 in the respective second heat transfer bodies 9, can be easily arranged in the respective heat transfer bodies 9. If the product flow channels 70 would be located on the inner side of the heat medium flow channels 31, for example, a part of the product flow channels 70 may overlap with a part of the heat medium flow channels 31, depending on the positions of the openings of the product flow channels 70 open to the outside on the respective side surfaces of the second heat transfer bodies 9. The arrangement configuration of the product flow channels 70 or the heat medium flow channels 31 in such a case may be complicated regardless of the overlap with each other. The present embodiment can avoid the overlap between the product flow channels 70 and the heat medium flow channels 31 even though the respective second communication ports 80 and the respective second drain ports 82 are open on the same side surface of the respective second heat transfer bodies 9, since the product flow channels 70 are located closer to the side surfaces of the respective second heat transfer bodies 9. This can also simplify the arrangement configuration of the product flow channels 70 that conforms to the arrangement configuration of the heat medium flow channels 31.

The reactor 1 can further achieve the effects in view of other aspects. For example, the temperature of the product P flowing through the respective product flow channels 70 is entirely lower than the temperature of the heat medium HC flowing through the heat medium flow channels 31. The arrangement of the product flow channels 70 on the outer side of the heat medium flow channels 31 can reduce the heat radiation from the heat medium HC toward the outside of the second heat transfer bodies 9 due to the product P flowing through the product flow channels 70. The reactor 1 can avoid heat loss of the heat medium HC flowing through the heat medium flow channels 31 accordingly, so as to decrease the amount of flow of the heat medium HC as compared with a case of not including the product flow channels 70 in the second heat transfer bodies 9, for example.

The thermal reaction for producing the product P from the reaction fluid M is not necessarily limited to the endothermic reaction, and may be an exothermic reaction, for example.

To avoid heat loss of the heat medium HC to decrease the amount of flow of the heat medium HC, the flowing direction of the product P in the product flow channels 70 may be opposite to the flowing direction of the heat medium HC in the heat medium flow channels 31.

The reactor 1 may include the plural main flow parts of the heat medium flow channels 31. The number of the main flow parts in the product flow channels 70 in this case may be smaller than the number of the main flow parts in the heat medium flow channels 31.

The reactor 1 as configured above has a clear definition in which the main heat source contributing to the thermal reaction in the reaction flow channels 17 is the heat medium HC flowing through the heat medium flow channels 31, while the high-temperature fluid containing the product P flowing through the product flow channels 70 serves as an auxiliary heat source. The arrangement of the product flow channels 70 in the respective second heat transfer bodies 9 can still keep the reacted amount or the reaction rate equivalent to the case of not being provided with the product flow channels 70, and can increase the heat efficiency. The term "increasing the heat efficiency" herein encompasses the contribution to the energy saving and the reduction in the heat radiation as described above.

The reactor 1 may also have the configuration in which the product flow channels 70 are arranged parallel to the heat medium flow channels 31.

While the present embodiment is illustrated with the case in which the product flow channels 70 are arranged parallel to the heat medium flow channels 31, as shown in FIG. 3, the product flow channels 70 is not necessarily arranged strictly in parallel, but may be slightly inclined to the heat medium flow channels 31. The reactor 1 with the configuration in which the product flow channels 70 are arranged parallel to the heat medium flow channels 31 can lead the flowing direction of the high-temperature fluid containing the product P flowing through the product flow channels 70 to conform to the flowing direction of the heat medium HC flowing through the heat medium flow channels 31. This configuration enables the high-temperature fluid containing the product P flowing through the product flow channels 70 to serve as a part of the heat source for the heat exchange more efficiently than a case in which the extending direction of the product flow channels 70 does not conform to the extending direction of the heat medium flow channels 31. The configuration in which the extending direction of the product flow channels 70 and the extending direction of the heat medium flow channels 31 conform to each other, further facilitates the manufacture of the second heat transfer bodies 9, as compared with the case in which the respective directions do not conform to each other, so as to have the advantage of reducing the manufacturing costs.

The reactor 1 may also have the configuration in which the respective openings on the inlet side of the product flow channels 70 are open in the same direction as the respective openings on the outlet side of the reaction flow channels 17.

The openings on the inlet side of the product flow channels 70 are the second communication ports 80, for example. The openings on the outlet side of the reaction flow channels 17 are the first communication ports 21, for example.

The respective communication spaces S3 are to communicate with both the respective openings on the inlet side of the product flow channels 70 and the respective openings on the outlet side of the reaction flow channels 17. The reactor 1 as configured above thus can reduce the distance between the respective openings on the inlet side of the product flow channels 70 and the respective openings on the outlet side of the reaction flow channels 17. This leads to a reduction in size of the communication spaces S3, so as to achieve a reduction in size or a simplification of the shape of the respective product communication parts 46 accordingly. Further, this configuration can introduce the high-temperature fluid containing the product P discharged from the respective reaction flow channels 17 immediately to the product flow channels 70, so as to avoid lowering the temperature of the high-temperature fluid, and has the advantage of the effective use thereof as a part of the heat source for the heat exchange with the reaction fluid M accordingly.

Since the heat exchange unit 3 as illustrated above has the configuration in which the first heat transfer bodies 7 and the second heat transfer bodies 9 have the same plane shape, the side surfaces of the respective heat transfer bodies correspond to any of the first side surface 60 to the fourth side surface 63 of the heat exchange unit 3. The phrase "open in the same direction" as used herein refers to not only the case in which the respective side surfaces of the first heat transfer bodies 7 and the second heat transfer bodies 9 on which the respective openings are provided are on the same planes as illustrated in the drawings, but also a case in which the respective surfaces are not on the same planes. Namely, the openings on the inlet side of the product flow channels 70 and the openings on the outlet side of the reaction flow channels 17 only need to be open in the same direction to achieve the effects of the present embodiment, regardless of whether the first heat transfer bodies 7 and the second heat transfer bodies 9 differ in the plane shape and the respective side surfaces have any steps.

The reactor 1 may also have the configuration in which the openings on the inlet side of the product flow channels 70 are aligned in the same line as the openings on the outlet side of the reaction flow channels 17 in the stacked direction of the first heat transfer bodies 7 and the second heat transfer bodies 9.

According to the reactor 1 as configured above, the distance between the openings on the inlet side of the product flow channels 70 and the openings on the outlet side of the reaction flow channels 17 can be shorter, so as to introduce the high-temperature fluid containing the product P discharged from the respective reaction flow channels 17 more immediately to the product flow channels 70. This configuration can further reduce the size of the communication spaces S3 communicating with both the openings on the inlet side of the product flow channels 70 and the openings on the outlet side of the reaction flow channels 17, so as to lead to a reduction in size or a simplification of the shape of the respective product communication parts 46 accordingly. The arrangement of the respective first communication ports 21a and the respective second communication ports 80a in the same line in the Z direction as illustrated in FIG. 1, can reduce the dimensions of the respective product communication parts 46 particularly in the Y direction.

The reactor 1 may also have the configuration in which a part of the inner wall of the respective product communication parts 46 includes a part of the side surfaces of the respective first heat transfer bodies 7 including the openings on the outlet side of the reaction flow channels 17 and a part of the side surfaces of the respective second heat transfer bodies 9 including the openings on the inlet side of the product flow channels 70.

According to the reactor 1 as configured above, the shape of the respective product communication parts 46 can be simplified into a case-like shape with one surface open. The respective product communication parts 46 with the case-like shape can be connected to the heat exchange unit 3 with the edges on the open surface joined by welding, for example, so as to be easily attached to the side surfaces of the first heat transfer bodies 7 and the second heat transfer bodies 9. The respective product communication parts 46 having the shape as described above can lead the high-temperature fluid in the respective communication spaces S3 to be brought into contact with a part of the respective side surfaces of the first heat transfer bodies 7 and the second heat transfer bodies 9, so as to avoid a decrease in the temperature of the high-temperature fluid in the respective communication spaces S3.

The reactor 1 may also have the configuration in which the openings on the outlet side of the product flow channels 70 are open in the same direction as the openings on the inlet side of the product flow channels 70.

The openings on the outlet side of the product flow channels 70 are the second drain ports 82, for example.

According to the reactor 1 as configured above, the arrangement configuration of the product flow channels 70 can avoid the overlap between the product flow channels 70 and the heat medium flow channels 31, and further facilitate the installation of the respective product recovery parts 49 for recovering the product P discharged from the openings on the outlet side of the product flow channels 70. For example, as illustrated above, the reactor 1, which includes the heat medium recovery parts 57 for recovering the heat medium HC discharged from the respective heat medium flow channels 31, can be provided with the product recovery parts 49 at the positions not overlapping with the heat medium recovery parts 57.

While the present disclosure has been illustrated above with the preferred embodiments, it should be understood that the present disclosure is not intended to be limited to these embodiments, and various modifications and changes can be made within the scope of the disclosure.

The entire content of Japanese Patent Application No. 2018-220447 (filed on Nov. 26, 2018) is herein incorporated by reference.

REFERENCE SIGNS LIST

1 REACTOR
7 FIRST HEAT TRANSFER BODY
9 SECOND HEAT TRANSFER BODY
17 REACTION FLOW CHANNEL
31 HEAT MEDIUM FLOW CHANNEL
70 PRODUCT FLOW CHANNEL
46 PRODUCT COMMUNICATION PART
HC HEAT MEDIUM
M REACTION FLUID
P PRODUCT
S3 COMMUNICATION SPACE

What is claimed is:

1. A reactor comprising:
a first heat transfer body including a reaction flow channel through which a reaction fluid flows;
a second heat transfer body stacked on the first heat transfer body, and including a heat medium flow channel through which a heat medium flows and a product flow channel through which a product flows that is produced in the reaction flow channel by a heat exchange between the reaction fluid and the heat medium; and
a product communication part including a communication space through which the product flows from the reaction flow channel to the product flow channel.

2. The reactor according to claim 1, wherein:
the reaction flow channel includes a plurality of main flow parts; and
the product flow channel includes at least one main flow part with a number fewer than a number of the main flow parts in the reaction flow channel.

3. The reactor according to claim 1, wherein at least one main flow part in the product flow channel is located closer to a side surface of the second heat transfer body than at least one main flow part in the heat medium flow channel in a direction in which the respective main flow parts are arranged parallel to each other.

4. The reactor according to claim 3, wherein:
the heat medium flow channel includes a plurality of the main flow parts; and
the product flow channel includes at least one main flow part with a number fewer than a number of the main flow parts in the heat medium flow channel.

5. The reactor according to claim 1, wherein the product flow channel is arranged parallel to the heat medium flow channel.

6. The reactor according to claim 1, wherein an opening on an inlet side of the product flow channel is open in a direction common to an opening on an outlet side of the reaction flow channel.

7. The reactor according to claim 6, wherein the opening on the inlet side of the product flow channel is aligned in a line common to the opening on the outlet side of the reaction flow channel in a stacked direction of the first heat transfer body and the second heat transfer body.

8. The reactor according to claim 6, wherein a part of an inner wall of the product communication part includes a part of a side surface of the first heat transfer body including the opening on the outlet side of the reaction flow channel and a part of a side surface of the second heat transfer body including the opening on the inlet side of the product flow channel.

9. The reactor according to claim 6, wherein an opening on an outlet side of the product flow channel is open in a direction common to the opening on the inlet side of the product flow channel.

* * * * *